United States Patent [19]

Aron

[11] 4,188,658
[45] Feb. 12, 1980

[54] ADJUSTABLE SUPPORT FOR PORTABLE LAMP

[75] Inventor: Daniel L. Aron, Northridge, Calif.

[73] Assignee: Mole-Richardson Co., Hollywood, Calif.

[21] Appl. No.: 820,087

[22] Filed: Jul. 29, 1977

[51] Int. Cl.$^2$ .......................... F21V 21/00; E04G 3/00
[52] U.S. Cl. .................................. 362/396; 248/214; 248/217.1; 248/224.2; 362/11
[58] Field of Search ............. 362/10, 11 X, 12, 226 X, 362/396, 803; 248/214, 216.1, 216.4, 217.1, 217.3, 220.2, 224.1, 224.2

[56] References Cited

U.S. PATENT DOCUMENTS

| 1,505,220 | 8/1924 | Shay | 362/396 |
|---|---|---|---|
| 2,018,836 | 10/1935 | Clemence | 362/396 |
| 2,354,404 | 7/1944 | Sayles | 248/214 |
| 3,034,256 | 5/1962 | Bonanno | 362/396 |
| 3,321,730 | 5/1967 | Schlangen | 362/396 |
| 3,340,390 | 9/1967 | Imre | 362/396 |
| 3,872,428 | 3/1975 | Boisuert | 362/396 |

Primary Examiner—Samuel W. Engle
Assistant Examiner—Donald P. Walsh
Attorney, Agent, or Firm—Edward A. Sokolski

[57] ABSTRACT

A portable lamp including a socket and bulb attached to two brackets adapted for temporary connection to pre-existing supporting members of various shapes and dimensions. The brackets are connected to each other by a hinge, and each bracket has a notch arranged to receive the supporting member. To tightly grip the supporting member, the angle between the brackets is adjusted so that the edges of the notches are pressed against the member. Step-shaped edges of the notches define rectangles of progressively decreasing width to accommodate supporting members of different size ranges.

4 Claims, 4 Drawing Figures

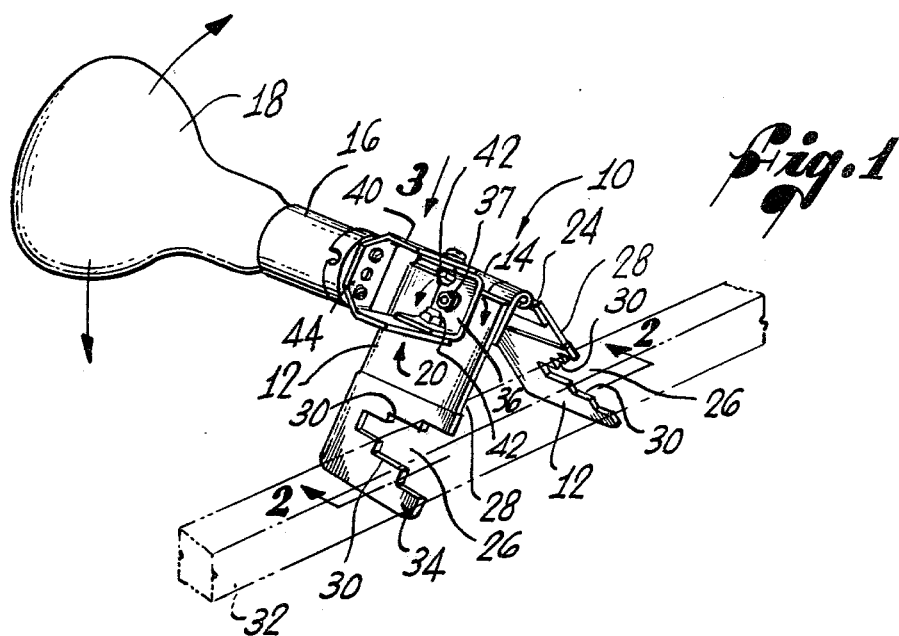
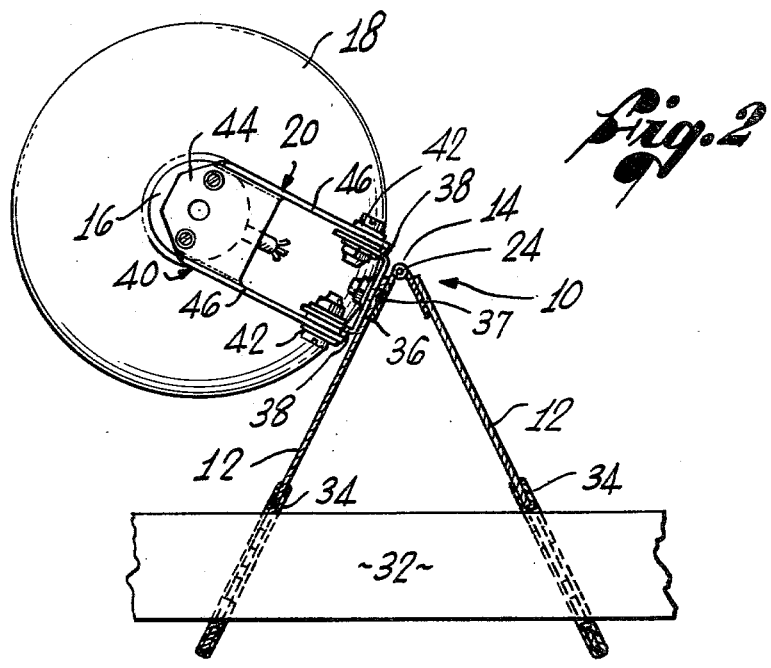
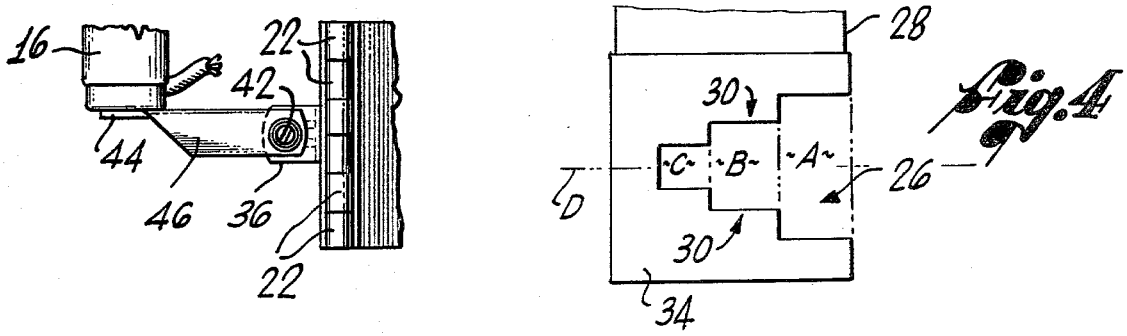

ADJUSTABLE SUPPORT FOR PORTABLE LAMP

BACKGROUND OF THE INVENTION

The present invention relates to lamps, and more particularly to movable lamps of the type which provide temporary illumination while photographs are taken.

The quality of a photographer's work is often dependent upon his ability to provide lighting that will fully illuminate his subject or illuminate it in a way that will produce the effect sought. It is therefore important that he be able to quickly and easily position lamps as desired. While the necessary variety of lighting arrangements is generally available in photographic studios, the photographer is often limited at other locations by the amount of lighting equipment he is able to bring with him and the time available in which to set it up. Moreover, when photographs are to be taken indoors, there is often limited space available in which to arrange stands for any lamps carried to the scene.

Most conventional photographic lamps that are in use today are mounted on tripod-type stands that are relatively bulky, even if collapsible, and may require considerable set-up time and space. Other portable lamps, such as that described in U.S. Pat. No. 3,088,024 to Lowell, utilize various forms of hooks and brackets that do not adequately secure the lamp or are not sufficiently versatile.

A principal objective of the present invention is to provide a portable photographic lamp of simple, compact construction that can be easily and quickly set up at a desired location, taking advantage of existing structures for firm and secure support at the desired position.

SUMMARY OF THE INVENTION

The present invention resides in a portable lamp adapted for temporary connection to pre-existing supporting members such as furniture, doors, poles and the edges of partitions of various shapes and dimensions. It includes a pair of notched brackets connected by a hinge, the hinge axis extending parallel to two opposing edges of each notch. An electrical socket connected to the brackets is held in the desired position when the angle between the brackets is properly adjusted and the supporting member is gripped by the edges of the notches. A deformable covering extending over the edges of the notches can provide more secure gripping action.

In a preferred embodiment, each of the notches has at least one edge with a step-shaped configuration, whereby the width of the notches varies to accommodate supporting members of different size ranges. The socket can be movably attached to the brackets by a pivotable arm, and additional flexibility can be provided by mounting the arm on a rotatable swivel member.

Other features and advantages of the present invention will become apparent from the following detailed description of a preferred form thereof and the attached drawing which illustrates, by way of example, the principles of the invention.

BRIEF DESCRIPTION OF THE DRAWINGS

FIG. 1 is a perspective view of a portable lamp embodying many novel features of the present invention, a supporting member to which it is attached being shown in phantom lines;

FIG. 2 is an enlarged cross-sectional view of the lamp taken along the line 2—2 of FIG. 1;

FIG. 3 is an enlarged fragmentary plane view of the lamp taken in the direction of the arrow 3 of FIG. 1; and FIG. 4 is an enlarged fragmentary view of an end of one of the lamp brackets.

DESCRIPTION OF THE PREFERRED EMBODIMENT

A portable lamp 10 of a type suitable for use by photographers embodying many novel features of the present invention is shown in FIGS. 1 through 4. It includes a pair of brackets 12 connected by a hinge 14, a socket 16 which receives a bulb 18, and a connection mechanism 20 by which the socket is attached to the brackets.

As best shown in FIG. 1, each bracket 12 is a flat metal plate. Interleaving tabs 22 on the adjacent ends of the plates are curled over to receive a hinge pin 24, as shown in FIG. 3, thereby forming the hinge 14 which is of conventional construction and permits the angle between the brackets to vary. Each bracket 12 has a notch 26, cut into one of its sides 28 generally perpendicular to the hinge 14. When the two brackets 12 are pressed together and overlie each other, the notches 26 are aligned.

Two opposing step-shaped edges 30 of each notch 26 extend generally parallel to the axis of the hinge 14 to define a plurality of rectangular areas A, B and C that decrease in width progressively with distance from the side of the bracket 12, as shown in FIG. 4. The notches 26 are symmetrical about center lines D parallel to the hinge axis.

A support member 32, which may be a post, the edge of a convenient door or partition, a piece of furniture or any other suitable object, is received within corresponding rectangular areas A, B, or C of the two notches 26 that are selected in accordance with the size of the member. The angle between the brackets 12 is made such that the edges 30 of the notches 26 firmly grip the support to hold the lamp 10 securely in position. To improve the grip of the bracket 12 on the support member 32, the ends of the brackets are covered with a soft, deformable plastic coating 34. It is important that the coating 34 extend over the edges 30 of the notches 26 to engage the support member 32.

It will be noted that a lamp 10 can very easily be attached to and removed from a wide variety of support members 12 likely to be found at locations where photographs are to be taken. All that is required is that the notches 26 be placed over the support member 12 and the hinge angle be increased for a firm grip. To release the lamp 10 from the support 12, the brackets 26 are merely drawn together into a sharper V-shaped configuration, causing them to move to a position more perpendicular to the support 12.

To further increase the versatility of the lamp 10, i. e., its ability to direct light in the desired direction, the socket 16 is movably attached to the brackets 12 by the connection mechanism 20 which includes a swivel member 36 rotatably mounted by a swivel pin 37 on the outer surface of one of the brackets 12 near the hinge 14, as shown in FIG. 2. The swivel member 36 is U-shaped, having two upstanding ends 38 to which an arm 40 is pivotably connected by nut and bolt sets 42, as shown in FIGS. 2 and 3. The arm 40 consists of a plate 44 attached directly to the socket 16 and two struts 46 perpendicular to the plate and extending from the plate to the ends of the swivel member 36.

While a particular form of the invention has been illustrated and described, it will be apparent that various modifications can be made without departing from the spirit and scope of the invention.

I claim:

1. A portable lamp adapted for temporary connection to preexisting supporting members of various shapes and dimensions comprising:

a pair of brackets each having a notch with opposing step-shaped edges therein;

hinge means for connecting said brackets having a hinge axis extending generally parallel to the edges of each of said notches;

said step-shaped edges running substantially parallel to said hinge axis and defining a plurality of substantially rectangular adjoining areas having progressively smaller widths in going from the open ends of said notches to the closed ends thereof;

an electrical socket; and means for connecting said socket to said brackets;

whereby a support member can be received by said notches and the angle between said brackets can be adjusted to cause the edges of a selected one of the rectangular areas of said notches to grip said supporting member.

2. The lamp of claim 1, further comprising a deformable covering extending at least over the edges of said notches to securely engage said supporting member.

3. The lamp of claim 1, wherein said connecting means includes means for permitting pivotal and rotational movement of said socket relative to said brackets.

4. The lamp of claim 1, wherein said connection means comprises an arm attached to said socket, a swivel member, means for rotatably connecting said swivel member to one of said brackets, and means for pivotably connecting said arm to said swivel member.

* * * * *